(12) United States Patent
Chu et al.

(10) Patent No.: US 12,566,960 B2
(45) Date of Patent: Mar. 3, 2026

(54) AUTOMATIC COMPRESSION OF MACHINE LEARNING MODELS

(71) Applicant: International Business Machines Corporation, Armonk, NY (US)

(72) Inventors: De Gao Chu, Beijing (CN); Lin Dong, Beijing (CN); Xiao Tian Xu, Chang De (CN); Xue Yin Zhuang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 17/817,662

(22) Filed: Aug. 5, 2022

(65) Prior Publication Data

US 2024/0046097 A1      Feb. 8, 2024

(51) Int. Cl.
| | |
|---|---|
| *G06N 3/082* | (2023.01) |
| *G06F 18/21* | (2023.01) |
| *G06F 18/211* | (2023.01) |
| *G06N 3/0495* | (2023.01) |

(52) U.S. Cl.
CPC ........... *G06N 3/082* (2013.01); *G06F 18/211* (2023.01); *G06F 18/217* (2023.01); *G06N 3/0495* (2023.01)

(58) Field of Classification Search
CPC ............................. G06N 3/082; G06N 3/0495
See application file for complete search history.

(56) References Cited

U.S. PATENT DOCUMENTS

| | | | | |
|---|---|---|---|---|
| 2020/0311552 A1* | 10/2020 | A | .......................... | G06N 3/082 |
| 2021/0065052 A1* | 3/2021 | Muralidharan | .......... | G06N 3/04 |
| 2021/0241172 A1* | 8/2021 | Tanaka | ................ | G06N 3/0495 |

(Continued)

FOREIGN PATENT DOCUMENTS

CN          112396181 A      2/2021

OTHER PUBLICATIONS

Liu, Sicong, et al. "On-demand deep model compression for mobile devices: A usage-driven model selection framework." Proceedings of the 16th annual international conference on mobile systems, applications, and services. 2018. (Year: 2018).*

(Continued)

*Primary Examiner* — Eric Nilsson
(74) *Attorney, Agent, or Firm* — CANTOR COLBURN LLP; Jordan Schiller

(57) ABSTRACT

A computer-implemented method for compressing a machine learning model includes converting an input machine learning model into a standard machine learning model. The method further includes converting the standard machine learning model into a plurality of pruned machine learning models, each of the pruned machine learning models converted using a corresponding pruning ratio from a pruning ratio candidate list. The method further includes determining, for each of the pruned machine learning models, a size-to-error ratio. The method further includes selecting, based on the size-to-error ratio of the pruned machine learning models, a first pruning ratio from the pruning ratio candidate list. The method further includes generating a compressed machine learning model by compressing the input machine learning model using the first pruning ratio that is selected. The method further includes deploying the compressed machine learning model for production.

14 Claims, 6 Drawing Sheets

(56) References Cited

U.S. PATENT DOCUMENTS

2021/0264278 A1    8/2021  Liu et al.

OTHER PUBLICATIONS

Humm, Bernhard G., and Alexander Zender. "An ontology-based concept for meta automl." Artificial Intelligence Applications and Innovations: 17th IFIP WG 12.5 International Conference, AIAI 2021, Hersonissos, Crete, Greece, Jun. 25-27, 2021, Proceedings 17. Springer International Publishing, 2021. (Year: 2021).*

He, Yihui, et al. "Amc: Automl for model compression and acceleration on mobile devices." Proceedings of the European conference on computer vision (ECCV). 2018. (Year: 2018).*

He et al., "AMC: AutoML for Model Compression and Acceleration on Mobile Devices, " arXiv:1802.03494v4 [cv.CV] Jan. 16, 2019, 17 pages.

Liu et al., "MetaPruning: Meta Learning for Automatic Neural Network Channel Pruning," arXiv:1903.10258v3 [cs.CV] Aug. 14, 2019, 10 pages.

* cited by examiner

Input: model_size_matrix, error_matrix, budget, granularity output: ratio for each layer Matrix Evaluation[layers, budget] = [error, size, ratio list]

| | 1 | 2 | ... | 99 | 100 |
|---|---|---|---|---|---|
| conv1 | | | | | |
| conv2 | | 1,2,[0.2,0,1] | | | |
| conv3 | | | | | |
| conv4 | | | | | 9,100,[0.1,0.8,0.5,0.6] |

Evaluation stats

Layers

115

Error:

Pruning Ratio

| | 0.2 | 0.4 | 0.6 | 0.8 | 1.0 |
|---|---|---|---|---|---|
| conv_0 | 3 | 4 | 0 | 1 | 3 |
| conv_1 | 0 | 0 | 1 | 4 | 4 |
| conv_2 | 1 | 2 | 4 | 2 | 4 |
| conv_3 | 3 | 4 | 2 | 4 | 2 |
| conv_4 | 4 | 1 | 1 | 0 | 1 |

Layers

304

Size:

Pruning Ratio

| | 0.2 | 0.4 | 0.6 | 0.8 | 1.0 |
|---|---|---|---|---|---|
| conv_0 | 20 | 20 | 20 | 0 | 80 |
| conv_1 | 20 | 0 | 0 | 60 | 40 |
| conv_2 | 20 | 0 | 60 | 20 | 20 |
| conv_3 | 60 | 80 | 0 | 20 | 60 |
| conv_4 | 80 | 40 | 80 | 0 | 60 |

Layers

302

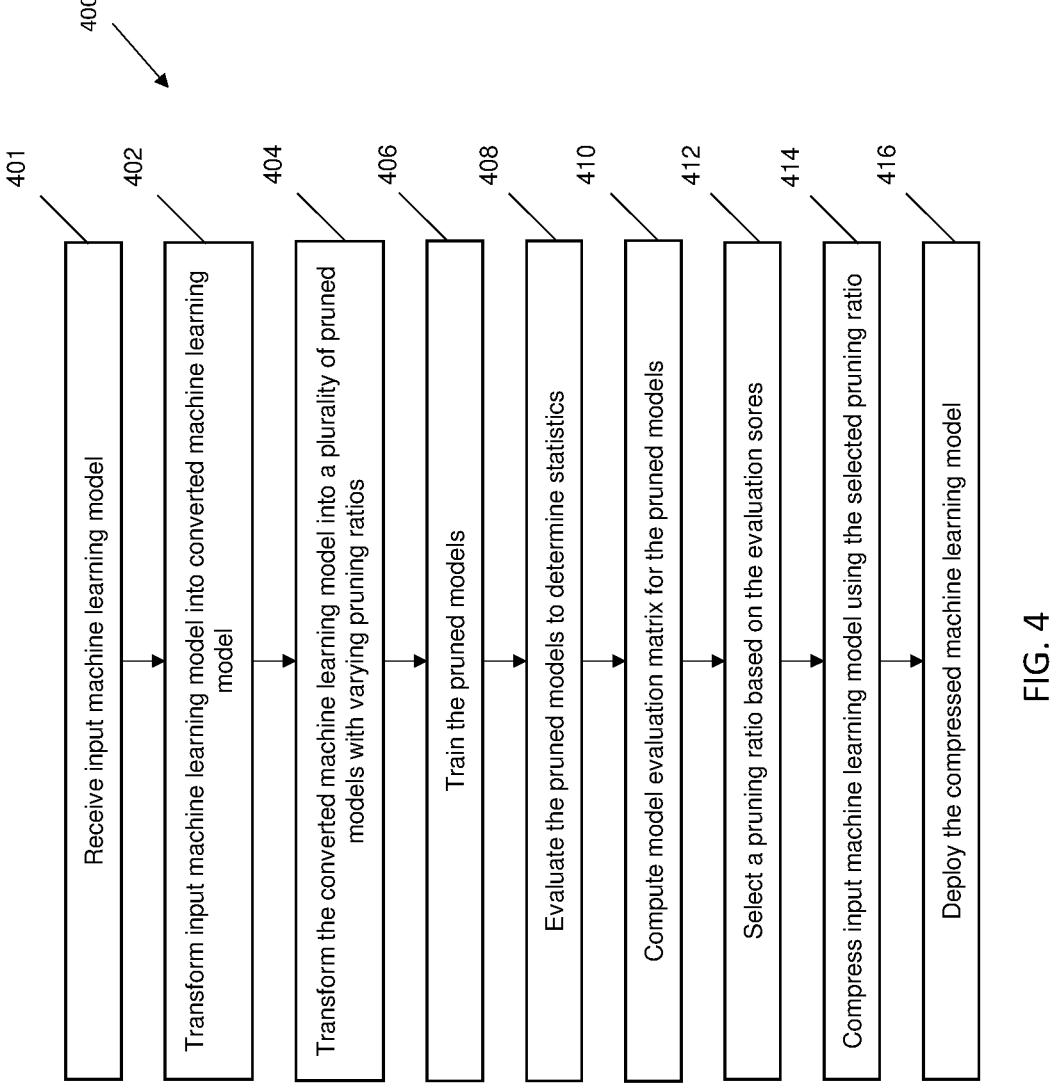

400

401   Receive input machine learning model

402   Transform input machine learning model into converted machine learning model 404   Transform the converted machine learning model into a plurality of pruned models with varying pruning ratios 406   Train the pruned models 408   Evaluate the pruned models to determine statistics 410   Compute model evaluation matrix for the pruned models 412   Select a pruning ratio based on the evaluation sores 414   Compress input machine learning model using the selected pruning ratio 416   Deploy the compressed machine learning model

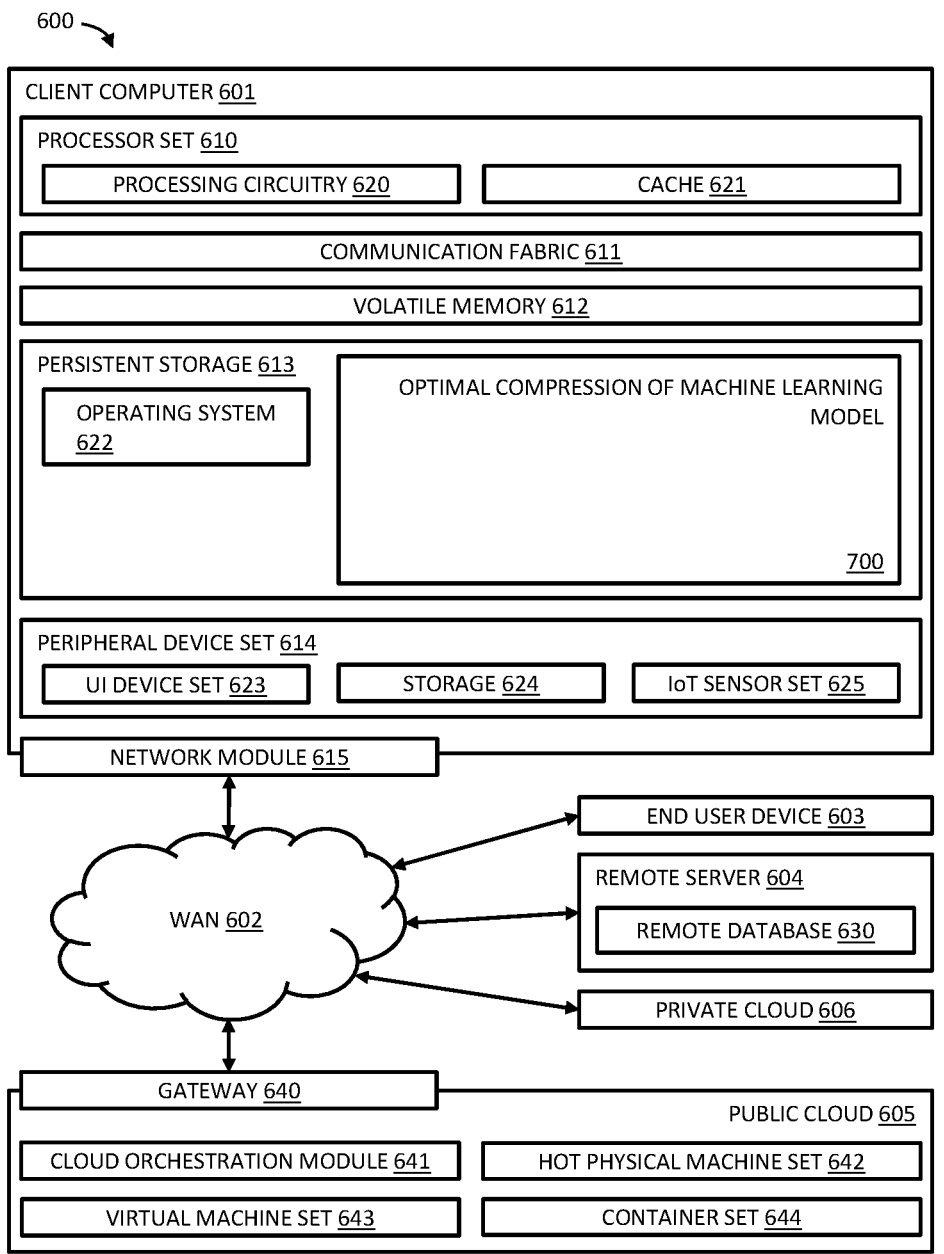

CLIENT COMPUTER 601

PROCESSOR SET 610

PROCESSING CIRCUITRY 620          CACHE 621

COMMUNICATION FABRIC 611

VOLATILE MEMORY 612

PERSISTENT STORAGE 613

OPERATING SYSTEM 622

OPTIMAL COMPRESSION OF MACHINE LEARNING MODEL

700

PERIPHERAL DEVICE SET 614

UI DEVICE SET 623          STORAGE 624          IoT SENSOR SET 625

NETWORK MODULE 615

WAN 602

END USER DEVICE 603

REMOTE SERVER 604

REMOTE DATABASE 630

PRIVATE CLOUD 606

GATEWAY 640

PUBLIC CLOUD 605

CLOUD ORCHESTRATION MODULE 641          HOT PHYSICAL MACHINE SET 642

VIRTUAL MACHINE SET 643          CONTAINER SET 644

FIG. 6

AUTOMATIC COMPRESSION OF MACHINE LEARNING MODELS

BACKGROUND

The present invention relates to computer technology, particularly to machine learning models and compressing such machine learning models.

Machine learning models are typically used to analyze large volumes of data and to generate insights from the large volumes of data ("big data"). Machine learning models, or machine learning algorithms (MLAs) are used for several applications using data that can include video, speech, text, location information, images, etc. There are several types of machine learning models, such as support vector machine (SVMs), distance-based classifier, decision tree model, a k-nearest neighbor (KNN) model, artificial neural network models, random forests, gradient boosted trees, and so forth. Machine learning models are present, for instance, in medicine, finance, imaging, electronic commerce, audio processing, and several other industries.

SUMMARY

According to one or more embodiments of the present invention, a computer-implemented method for compressing a machine learning model includes converting an input machine learning model into a standard machine learning model. The method further includes converting the standard machine learning model into a plurality of pruned machine learning models, each of the pruned machine learning models converted using a corresponding pruning ratio from a pruning ratio candidate list. The method further includes determining, for each of the pruned machine learning models, a size-to-error ratio. The method further includes selecting, based on the size-to-error ratio of the pruned machine learning models, a first pruning ratio from the pruning ratio candidate list. The method further includes generating a compressed machine learning model by compressing the input machine learning model using the first pruning ratio that is selected. The method further includes deploying the compressed machine learning model for production.

According to one or more embodiments of the present invention, a system includes a memory, and a processor coupled to the memory, the processor configured to perform a method. The method includes converting an input machine learning model into a standard machine learning model. The method further includes converting the standard machine learning model into a plurality of pruned machine learning models, each of the pruned machine learning models converted using a corresponding pruning ratio from a pruning ratio candidate list. The method further includes determining, for each of the pruned machine learning models, a size-to-error ratio. The method further includes selecting, based on the size-to-error ratio of the pruned machine learning models, a first pruning ratio from the pruning ratio candidate list. The method further includes generating a compressed machine learning model by compressing the input machine learning model using the first pruning ratio that is selected. The method further includes deploying the compressed machine learning model for production.

A computer program product includes a memory device with computer-executable instructions therein, the computer-executable instructions when executed by a processing unit perform a method. The method includes converting an input machine learning model into a standard machine learning model. The method further includes converting the standard machine learning model into a plurality of pruned machine learning models, each of the pruned machine learning models converted using a corresponding pruning ratio from a pruning ratio candidate list. The method further includes determining, for each of the pruned machine learning models, a size-to-error ratio. The method further includes selecting, based on the size-to-error ratio of the pruned machine learning models, a first pruning ratio from the pruning ratio candidate list. The method further includes generating a compressed machine learning model by compressing the input machine learning model using the first pruning ratio that is selected. The method further includes deploying the compressed machine learning model for production.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings.

FIG. 4 depicts a flowchart of a method for compressing a machine learning model prior to deployment according to one or more embodiments of the present invention.

FIG. 6 depicts a computing environment in accordance with one or more embodiments of the present invention.

Figure 1:
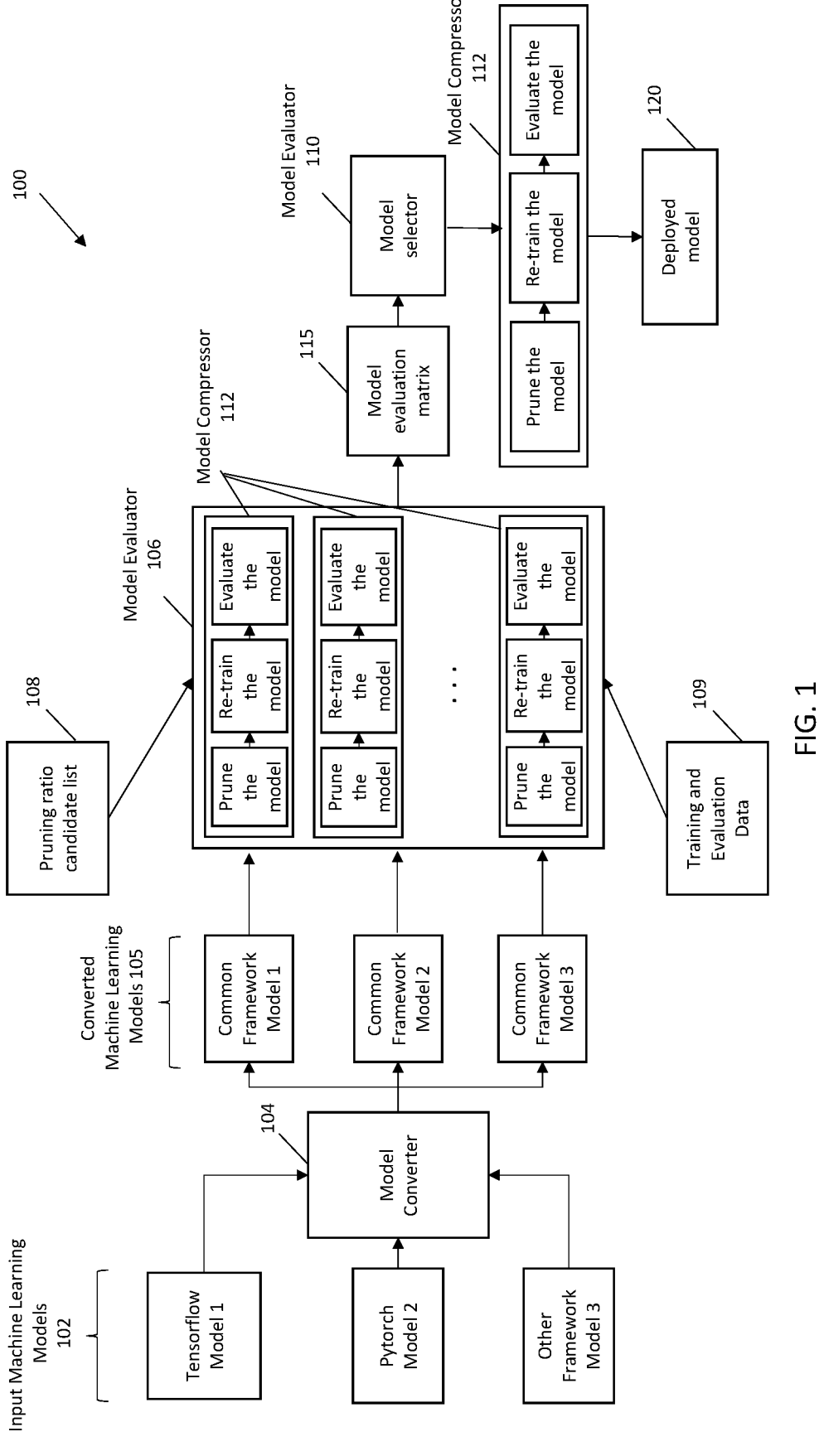
FIG. 1 depicts a block diagram of a system according to one or more embodiments of the present invention.

The diagrams depicted herein are illustrative. There can be many variations to the diagrams, or the operations described therein without departing from the spirit of the invention. For instance, the actions can be performed in a differing order, or actions can be added, deleted, or modified. Also, the term "coupled," and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Embodiments of the invention described herein address technical challenges in computing technology, particularly in fields where machine learning models (also referred to as artificial intelligence, deep learning, etc.) are used. Embodiments of the present invention are rooted in computing technology. Embodiments of the present invention provide improvements to computing technology, particularly machine learning (or artificial intelligence) based systems. Further, one or more embodiments of the present invention provide a practical application for deploying machine learning models for use on one or more computing systems, such as computer servers, desktop computers, laptop computers, tablet computers, phones, and other such computing systems.

One or more embodiments of the present invention provide such improvements and practical applications by facilitating compression of machine learning models prior to deployment on to production systems (i.e., in the field). Accordingly, embodiments of the present invention facilitate reduction in hardware requirement, improvement in latency, and resource/cost savings.

Present state-of-the-art machine learning model compression techniques are expensive and are not use friendly. The state-of-the-art techniques rely on expert knowledge and multitude of manually experiments. Some state-of-the-art techniques for compressing machine learning models use reinforcement learning, which also requires several experiments, and manual programming. Further, there is a lack of a common method that can applied to all machine learning model frameworks.

Embodiments of the present invention address such technical challenges with the state-of-the-art techniques and provide technical solutions that facilitate compressing machine learning models that are to be deployed on production systems. The technical solutions described herein are faster than present techniques. Embodiments of the present invention do not rely on reinforcement learning, and are transparent to the type of machine learning models that are to be compressed. Further, embodiments of the present invention facilitate such machine learning model compression in a user friendly manner, without any programming from the user (or in some cases negligible amount of programming).

FIG. 1 depicts a block diagram of a system 100 according to one or more embodiments of the present invention. The system 100 can be implemented using one or more computing devices in one or more embodiments of the present invention. Alternatively, or in addition, in one or more embodiments of the present invention, the system 100 can be implemented on a single computing system. A computing system can be a computer server, a desktop computer, a laptop computer, a tablet computer, a phone, or any other such computing device. A computing system can include one or more processing units. In one or more embodiments of the present invention, several computing systems can work in a distributed manner.

The system 100 includes, among other components, a model converter 104, a model evaluator 106, a model selector 110, and a model compressor 112. Each of these components can be executed independently by a computing device in some embodiments. Alternatively, or in addition, the components can be implemented by using distributed computing in some embodiments. Alternatively, or in addition, the components can be combined and/or separated different from what is shown in FIG. 1.

The model converter 104 is responsible for converting an input machine learning model 102 (first machine learning model) into a standard machine learning model 105 (second machine learning model) that uses a common model framework. For example, the Open Neural Network Exchange (ONNX) can be used as the common model framework. It is understood that another machine learning model framework can be used as the common framework in other embodiments of the present invention. The model converter 104 can receive multiple machine learning models 102 as input. The multiple machine learning models 102 are substitutes for each other, i.e., the input machine learning models 102 are designed for the same purpose, but with different structures and/or frameworks. The input machine learning models 102 can be designed and structured using any framework, such as TENSORFLOW, PYTORCH, or any other machine learning model framework available today, or later developed. In some embodiments of the present invention, two input machine learning models 102 can be designed using the same framework (e.g., PYTORCH), but have different structures. In some embodiments of the present invention, the machine learning models 102 can be designed and developed by different sets of developers. The model converter 102 converts the input machine learning models 102 into corresponding standard machine learning models 105.

With the development of deep learning techniques, various deep learning frameworks have been developed (e.g., PYTORCH, TENSORFLOW, etc.), and these frameworks are characterized by one another, and no one of them is a de facto standard. In each framework, the used model definition formats are not compatible with each other, and if the framework is migrated from one framework to another framework, reprogramming, i.e., conversion, is generally needed. Multiple deep learning/machine learning framework vendors have cooperatively released ONNX as a de facto standard. Several frameworks support the deep learning model to be exported in the ONNX format, which lays a foundation for model transplantation. ONNX is a standard for representing deep learning models, which enables the model to be transferred between different frameworks and consists of three parts: defining an extensible computation graph model, defining a standard data type, and defining a built-in operator. In one or more embodiments of the present invention, the model converter 104 uses ONNX as the common framework into which an input machine learning model 102 is transformed into when generating the standard machine learning model 105. In other embodiments of the present invention, a different common framework can be used.

The model evaluator 106 facilitates assessing the input machine learning models 102 to facilitate identifying one of the input machine learning models 102 as the deployed model 120. The deployed model 120 is provided for final execution by the user, for example, consumer, of the machine learning system being developed. The deployed model 120 may be used for execution on one or more computing systems, such as server computers, desktop computers, laptop computers, tablet computers, phones, etc.

The model evaluator 106 helps assess the input machine learning models 102 after compressing the corresponding standard machine learning models 105. The model evaluator uses a model compressor 112 to compress the standard machine learning models 105. The model compressor 112 prunes each standard machine learning model 105 using several potential pruning ratios. For example, the model evaluator receives a pruning ratio candidate list 108.

Figure 2:
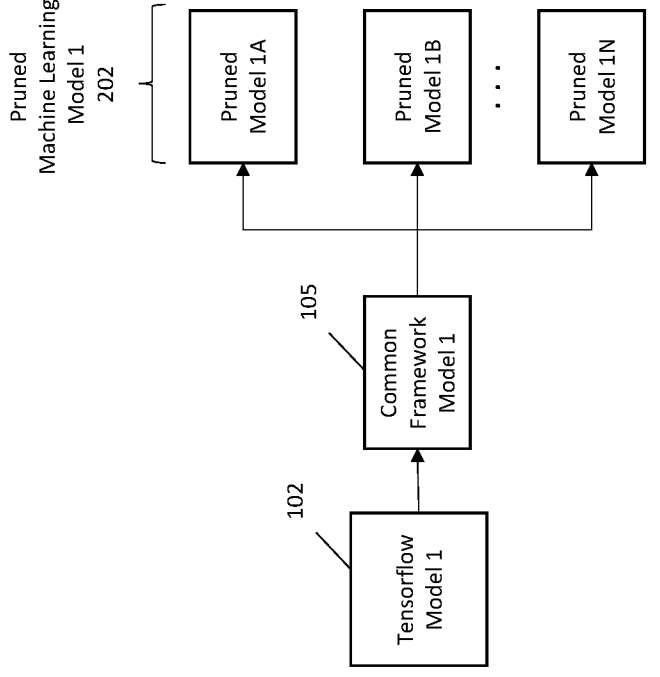
FIG. 2 depicts a block diagram of pruning models according to a pruning ratio candidate list according to one or more embodiments of the present invention.

FIG. 2 depicts a block diagram of pruning models according to a pruning ratio candidate list according to one or more embodiments of the present invention. The pruning ratio candidate list 108 includes a list of pruning ratios to be evaluated for the input machine learning models 102. In some embodiments, the pruning ratio candidate list 108 may include different pruning ratios for each different type of input machine learning models 102. In other embodiments, all the input machine learning models 102 are assessed using a common pruning ratio candidate list 108. The model evaluator 106 uses the model compressor 112 to prune each input machine learning model 102 and generate multiple pruned models 202 (FIG. 2). An input machine learning model 102 can be a TENSORFLOW model, for example, which is converted into the common framework, say ONNX. The standard machine learning model 105 is transformed into N pruned machine learning models 202 based on the N pruning ratios in the candidate list 108. N can be any integer. Accordingly, each input machine learning model 102 is first transformed into a standard machine learning model 105, which is then transformed into multiple pruned machine learning models 202. There is a one-to-many relationship between an input machine learning model 102 and corresponding pruned machine learning models 202, in some embodiments of the present invention.

Pruning can significantly speed up deployments of machine learning models, while reducing model storage size. However, pruning can affect metrics such as accuracy of the machine learning models. In the case of machine learning models, pruning is the process of removing weight connections to increase inference speed and decrease model storage size. Machine learning models can be over parameterized, and pruning can remove unused parameters from such machine learning models, improving the efficiency of the machine learning models. Embodiments of the present invention can use several types of algorithms to prune the machine learning models. A list of possible pruning algorithms includes but is not limited to variational dropout, regularization methods such as L0 or Hoyer, second-order methods as those developed by Lecun, or Wood-Fisher, weight reintroduction techniques such as Rig, gradual magnitude pruning (GMP), or any other such pruning techniques that are known, or later developed. Embodiments of the present invention can use structured or unstructured pruning.

The pruned machine learning models 202 are re-trained by the model compressor 112, in some embodiments of the present invention. In other embodiments, the pruned models 202 are not re-trained. The pruned machine learning models 202 are evaluated by the model compressor 112. The training (if performed) and evaluation is done using a common set of training and evaluation data 109 across all the pruned machine learning models 202. The training includes adjusting weights of the pruned machine learning models 202. The evaluation includes determining statistics such as accuracy, precision, recall, F1 score, and other such statistics or a combination thereof.

The model evaluator 106 outputs one or more model evaluation matrices 115 that enumerate statistics that can be used to compare the pruned machine learning models 202 (and in turn the input machine learning models 102).

Figure 3:
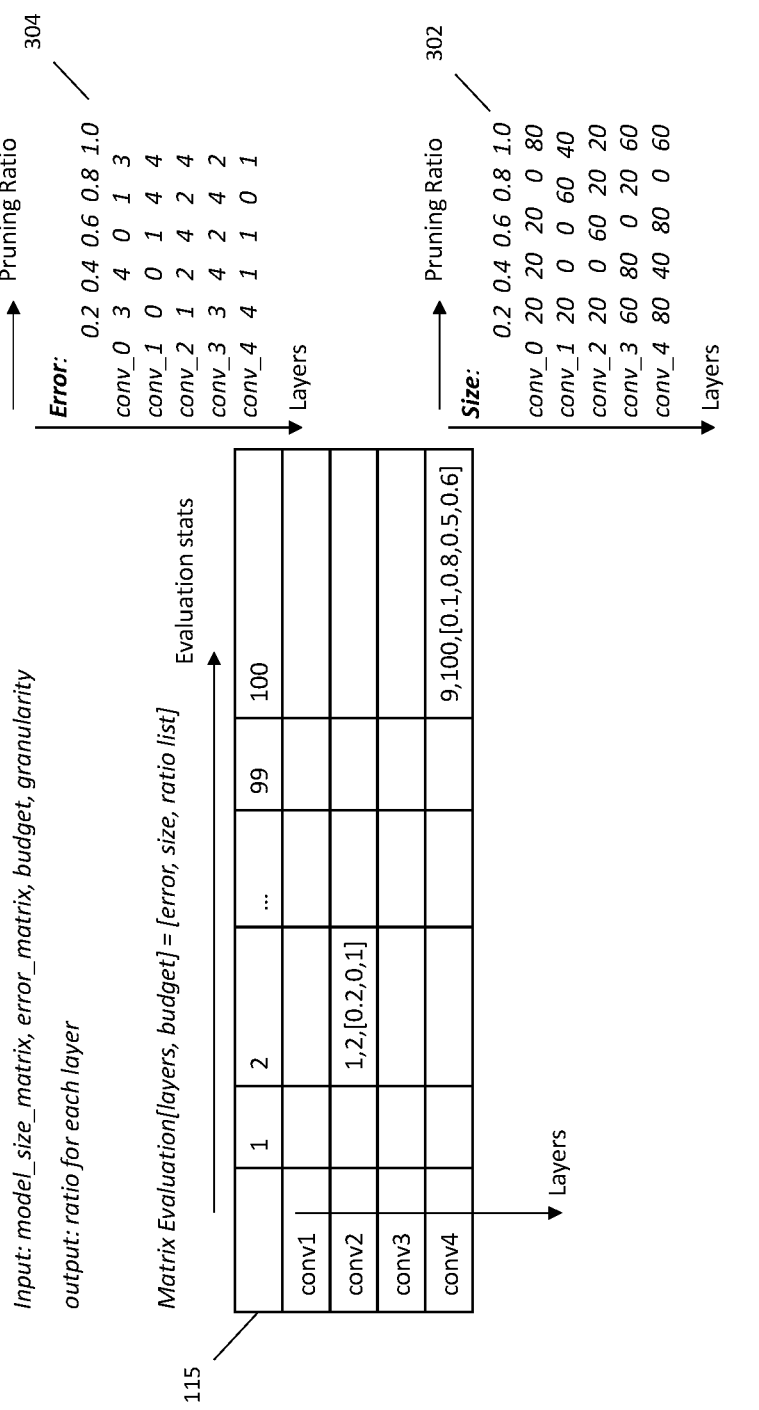
FIG. 3 depicts an example model evaluation matrix according to one or more embodiments of the present invention.

FIG. 3 depicts an example model evaluation matrix 115 according to one or more embodiments of the present invention. In some embodiments of the present invention, each pruned machine learning model 202 has a corresponding model error matrix 302, and a model size matrix 304.

The model size matrix 302 represents each layer of the corresponding pruned machine learning model 202 as a row, and each pruning ratio from the pruning ratio candidate list 108 as a column. Each entry in the model size matrix [i, j] represents the size of the ith row when the jth pruning ratio is used to transform the pruned model 202.

The model error matrix 304 represents each layer of the corresponding pruned machine learning model 202 as a row, and each pruning ratio from the pruning ratio candidate list 108 as a column. Each entry in the model error matrix [i, j] represents the error of the ith row when the jth pruning ratio is used to transform the pruned model 202.

Using the model size matrices 302 and the model error matrices 304, the model evaluator 110 computes the model evaluation matrix 115. The evaluation matrix 115 represents the various layers of the pruned models 202 as the rows. In one or more embodiments of the present invention, for columns, the evaluation matrix 115 a user provided list of budgets. In one or more embodiments of the present invention, a "budget" can be an available size (storage size, or memory size) for deploying a particular layer. In one or more embodiments of the present invention, the "budget" can be an available size (storage size, memory size) for deploying the machine learning model. Alternatively, for columns, the evaluation matrix 115 the pruning ratio candidate list 108 is used (similar to the model size matrices 302 and the model error matrices 304).

Each entry in the model evaluation matrix 115 is computed based on the model size matrices 201 and the model error matrices 304. Each entry [i, j] in the model evaluation matrix 115 represents a score for each layer based on a ratio of the size and error of each layer. In one or more embodiments of the present invention, an aggregation of the scores of across each column of the model evaluation matrix 115 represents a total score of the machine learning model for that budget. For example, the aggregation can be based on a sum, a difference, or any other such arithmetic and/or statistical technique. The pseudo-code/algorithm in table 1 is used to search best ratio of each layer based on the size/error matrix. Then the model can be pruned based on the ratio.

TABLE 1

```
model_size = (model_size − min_size/layers)/(max_size-min_size)*
granularity
budget = (budget−min_size)/(max_size-min_size)* granularity
For layer in layers:
    for budget in range(budget):
        for ratio in ratio_list:
            curr_size = model_size_matrix[layer,ratio]
            curr_error = error_matrix[layer, ratio]
            pre_layer = layers[layer_idx−1]
            min_error, ratio = min(solution.at(pre_layer, budget-
current_size) + current_error)
        solution[layer, budget] = (min_error, pre_size + curr_size,
solution[pre_layer, budget-current_size]+ratio)
    return solution.at[layers[−1], budget]
```

Based on the model evaluation matrix 115, the best pruning ratio from the pruning ratio candidate list 108 is selected. The selection can be selecting the column j from the model evaluation matrix 115 with the highest total score, in one or more embodiments of the present invention. Alternatively, if the model evaluation matrix 115 is populated in a different manner, the selection of the best pruning ratio can be different in other embodiments of the present invention.

Once the optimal pruning ratio is selected, the input machine learning model 102 is processed by the model compressor 112 using the optimal pruning ratio to generate the deployed model 120. The deployed model 120 is the compressed model generated by the model compressor 112. The deployed model 120 is transferred to the execution/production machine, for example, user-facing machine, for execution in the production, or in the field. The deployed model 120, in one or more embodiments of the present invention, is used to analyze unseen data (other than training data) and provide one or more predictions/estimates based on the machine learning model (102) that is represented by the deployed model 120.

FIG. 4 depicts a flowchart of a method for compressing a machine learning model prior to deployment according to one or more embodiments of the present invention. The method 400 can be implemented by one or more computing systems to automatically compress an input machine learning models 102 in an optimal manner before deployment.

At block 401, the input machine learning model 102 is received. The input machine learning model 102 can be designed, developed, and structured using any known machine learning model framework. The input machine learning model 102 can be received in a digital manner, for example, as a transfer of one or more files, a transfer of links to the one or more files, etc.

At block 402, the input machine learning model is transformed into the corresponding standard machine learning model 105 in the common framework.

At block 404, the standard machine learning model 105 is transformed into one or more pruned models 202. The number of pruned models 202 is based on the number of pruning ratios in the pruning ratio candidate list 108, one pruned model 202 for each pruning ratio. A pruned model 202 is reduced in size (storage size, memory size) in comparison to the input machine learning model 102. The reduction in size is achieved, for example, by reducing the number of parameters, connections, or other attributes of the machine learning model 102.

At block 406, each of the pruned models 202 is re-trained. At block 408, each of the pruned models 202 is evaluated. The evaluation generates a pair of the model size matrix 302 and the model error matrix 304 for each pruned model 202.

At block 410, a model evaluation matrix 115 is generated based on the evaluations of the pruned models 202. The model evaluation matrix 115 can provide size-to-error ratio for the one or more layers of each of the pruned models 202. In some embodiments of the present invention, the size-to-error ratio is computed for each pruned model 202 by aggregating the size-to-error ratios of the several layers. For example, the size-to-error ratios of the several layers of a pruned model 202 can be aggregated into an evaluation-score for the pruned model 202. For example, the aggregation can include a sum, a product, sum of squares, etc. In one or more embodiments of the present invention, the aggregation is performed in a weighted manner, where each layer is assigned a weight.

At block 412, the evaluation scores and the model evaluation matrix 115 is used to select a pruning ratio to be used for the input machine learning model. The selected pruning ratio is optimal in terms of reduction in the size of the input machine learning model 102 and the loss (or improvement) in accuracy (or any other statistic) of the pruned model 202 (corresponding to the input machine learning model 102).

At block 414, the input machine learning model 102 is compressed using the selected pruning ratio. In some embodiments of the present invention, the compressed model is re-trained. In some embodiments of the present invention, the re-trained compressed model is evaluated to confirm the statistics.

At block 416, the compressed model that is generated using the selected pruning ratio is deployed to the execution system.

Figure 5:
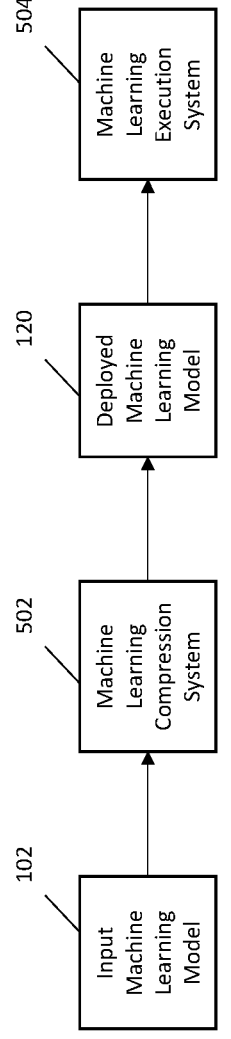
FIG. 5 depicts an example system according to one or more embodiments of the present invention.

FIG. 5 depicts an example system 500 according to one or more embodiments of the present invention. The system 500 includes a machine learning compression system 502 and a machine learning execution system 504. The machine learning compression system 502 is a computing system that implements the method 400 in one or more embodiments of the present invention. The machine learning compression system 502 can be a computer server, desktop computer, laptop computer, tablet computer, phone, etc. In one or more embodiments of the present invention, the machine learning compression system 502 is a cloud-based system. The machine learning compression system 502 receives one or more input machine learning models 102 and creates the corresponding deployment models 120. The deployment model 120 is transferred to the machine learning execution system 504.

The machine learning execution system 504 can be a computer server, desktop computer, laptop computer, tablet computer, phone, etc. The machine learning execution system 504 can be a cloud-based system. In one or more embodiments of the present invention, the machine learning execution system 504 is client/user facing.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 6 depicts a computing environment in accordance with one or more embodiments of the present invention. Computing environment 600 contains an example of an environment for the execution of at least some of the computer code involved in performing the inventive methods, such as optimal compression of machine learning model 700. In addition to block 700, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 700, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 1. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 700 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 700 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The present invention can be a system, a method, and/or a computer program product at any possible technical detail level of integration. The computer program product can include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for compressing a machine learning model, the computer-implemented method comprising:

converting an input machine learning model by translating the input machine learning model, which may be structured using any machine learning framework, into a standard machine learning model that uses a predetermined framework, wherein the predetermined framework provides a common model definition format compatible across heterogeneous model sources;

converting the standard machine learning model into a plurality of pruned machine learning models, each of the pruned machine learning models converted using a corresponding pruning ratio from a pruning ratio candidate list;

determining, for each of the pruned machine learning models, a size-to-error ratio;

selecting, based on the size-to-error ratio of the pruned machine learning models, a first pruning ratio from the pruning ratio candidate list, wherein the selection is based on a budget that comprises an available size for deploying the machine learning model and a latency for deploying the machine learning model;

generating a compressed machine learning model by compressing the input machine learning model using the first pruning ratio that is selected; and deploying the compressed machine learning model for production to an execution system.

2. The computer-implemented method of claim 1, wherein determining the size-to-error ratio for each of the pruned machine learning models comprises determining a size-to-error ratio for each layer of each of the pruned machine learning models, and aggregating the size-to-error ratio for each layer.

3. The computer-implemented method of claim 1, wherein determining, for each of the pruned machine learning models, a size-to-error ratio comprises computing a model evaluation matrix that comprises an evaluation score for each of the pruned machine learning models.

4. The computer-implemented method of claim 1, wherein the compressed machine learning model has a smaller size than the input machine learning model.

5. The computer-implemented method of claim 1, wherein the compressed machine learning model is generated by a first computing system and is deployed to a second computing system that executes the compressed machine learning model.

6. A system comprising:

a memory; and a processor coupled to the memory, the processor configured to perform a method comprising:

converting an input machine learning model by translating the input machine learning model, which may be structured using any machine learning framework, into a standard machine learning model that uses a predetermined framework, wherein the predetermined framework provides a common model definition format compatible across heterogeneous model sources;

converting the standard machine learning model into a plurality of pruned machine learning models, each of the pruned machine learning models converted using a corresponding pruning ratio from a pruning ratio candidate list;

determining, for each of the pruned machine learning models, a size-to-error ratio;

selecting, based on the size-to-error ratio of the pruned machine learning models, a first pruning ratio from the pruning ratio candidate list, wherein the selection is based on a budget that comprises an available size for deploying the machine learning model and a latency for deploying the machine learning model;

generating a compressed machine learning model by compressing the input machine learning model using the first pruning ratio that is selected; and

deploying the compressed machine learning model for production to an execution system.

7. The system of claim 6, wherein determining the size-to-error ratio for each of the pruned machine learning models comprises determining a size-to-error ratio for each layer of each of the pruned machine learning models, and aggregating the size-to-error ratio for each layer.

8. The system of claim 6, wherein determining, for each of the pruned machine learning models, a size-to-error ratio comprises computing a model evaluation matrix that comprises an evaluation score for each of the pruned machine learning models.

9. The system of claim 6, wherein the compressed machine learning model has a smaller size than the input machine learning model.

10. The system of claim 6, wherein the compressed machine learning model is generated by a first computing system and is deployed to a second computing system that executes the compressed machine learning model.

11. A computer program product comprising a non-transitory memory device with computer-executable instructions therein, the computer-executable instructions when executed by a processing unit perform a method comprising:

converting an input machine learning model by translating the input machine learning model, which may be structured using any machine learning framework, into a standard machine learning model that uses a predetermined framework, wherein the predetermined framework provides a common model definition format compatible across heterogeneous model sources;

converting the standard machine learning model into a plurality of pruned machine learning models, each of the pruned machine learning models converted using a corresponding pruning ratio from a pruning ratio candidate list;

determining, for each of the pruned machine learning models, a size-to-error ratio;

selecting, based on the size-to-error ratio of the pruned machine learning models, a first pruning ratio from the pruning ratio candidate list, wherein the selection is based on a budget that comprises an available size for deploying the machine learning model and a latency for deploying the machine learning model;

generating a compressed machine learning model by compressing the input machine learning model using the first pruning ratio that is selected; and deploying the compressed machine learning model for production to an execution system.

12. The computer program product of claim 11, wherein determining the size-to-error ratio for each of the pruned machine learning models comprises determining a size-to-error ratio for each layer of each of the pruned machine learning models, and aggregating the size-to-error ratio for each layer.

13. The computer program product of claim 11, wherein determining, for each of the pruned machine learning models, a size-to-error ratio comprises computing a model evaluation matrix that comprises an evaluation score for each of the pruned machine learning models.

14. The computer program product of claim 11, wherein the compressed machine learning model has a smaller size than the input machine learning model.

* * * * *